2,962,257

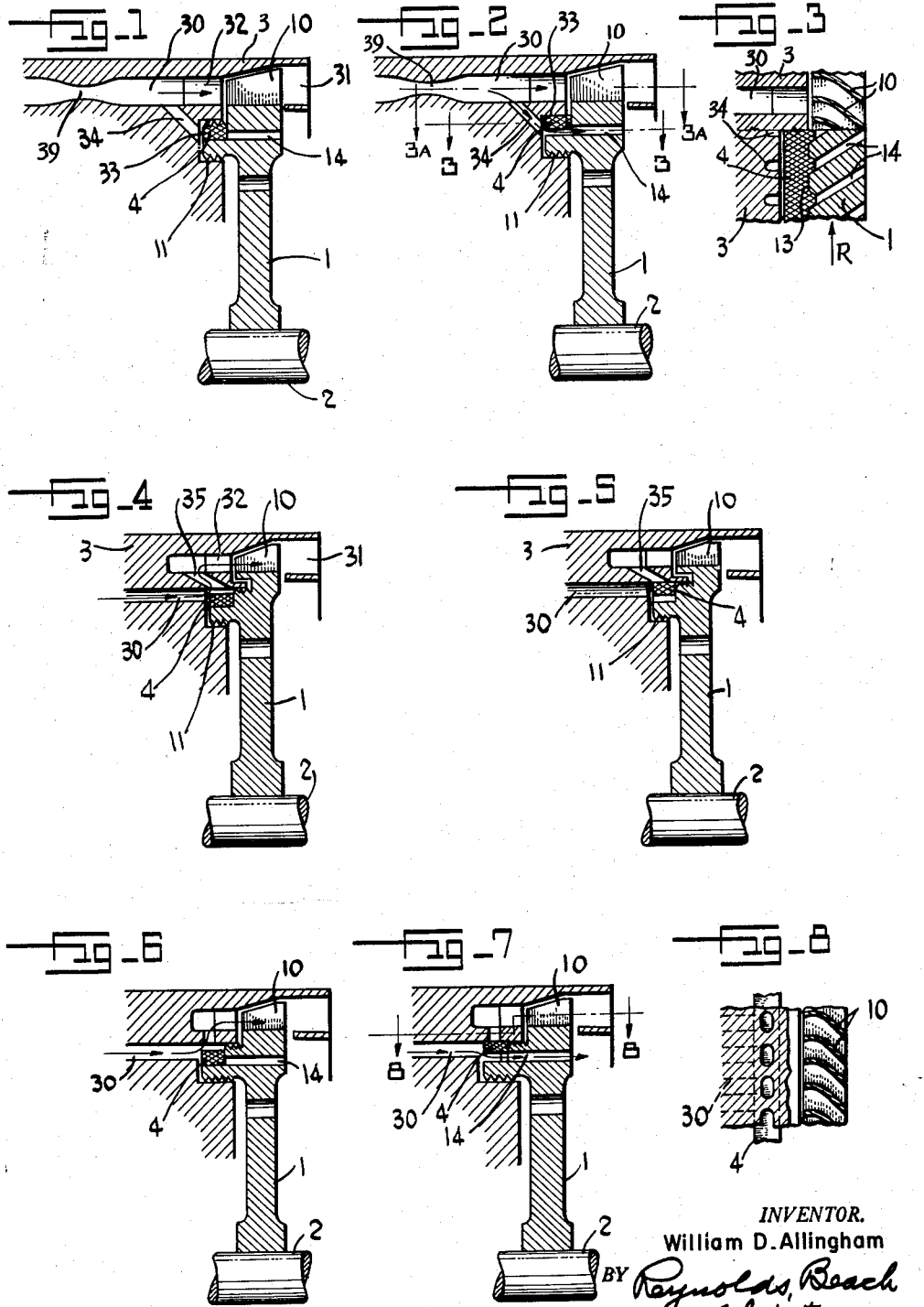

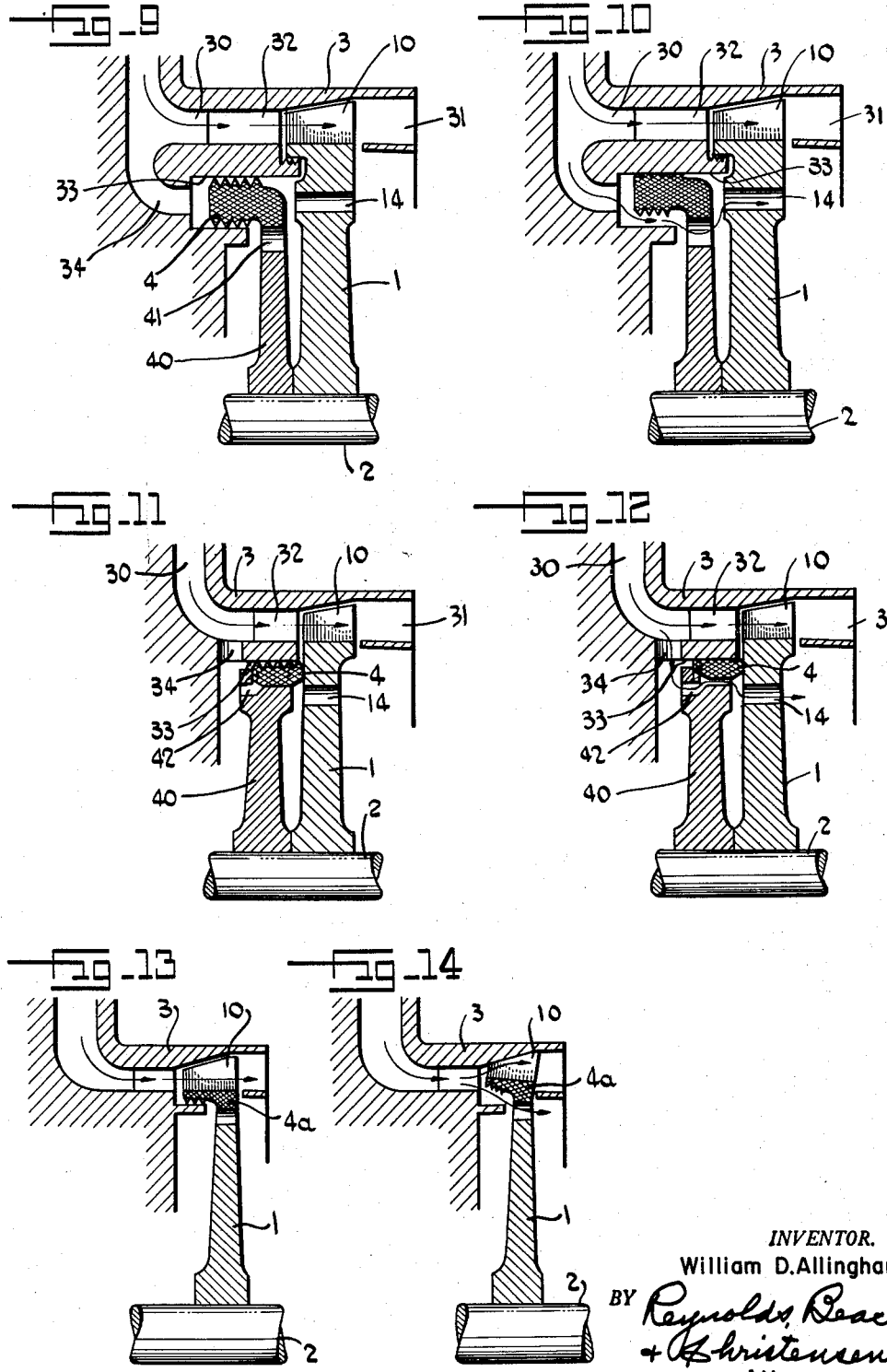

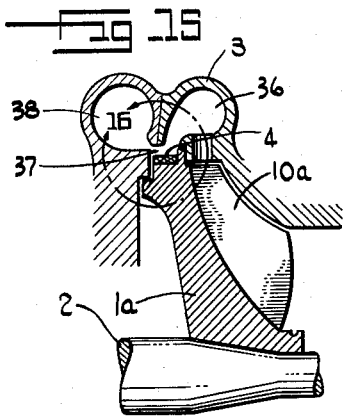
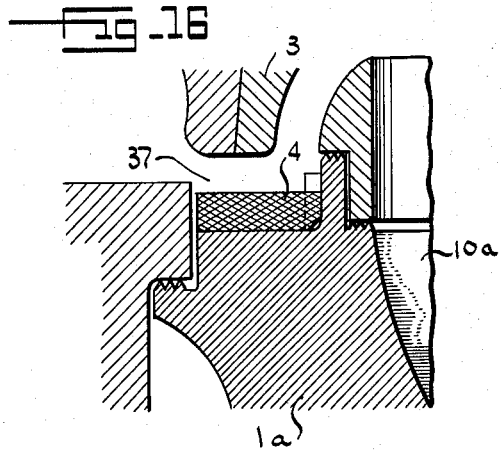
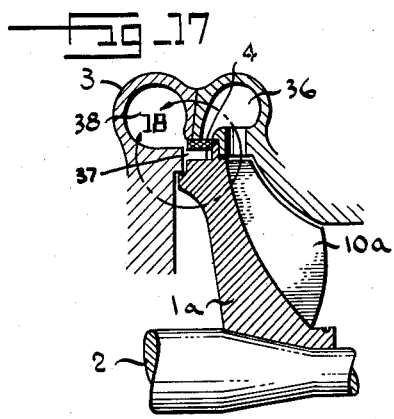
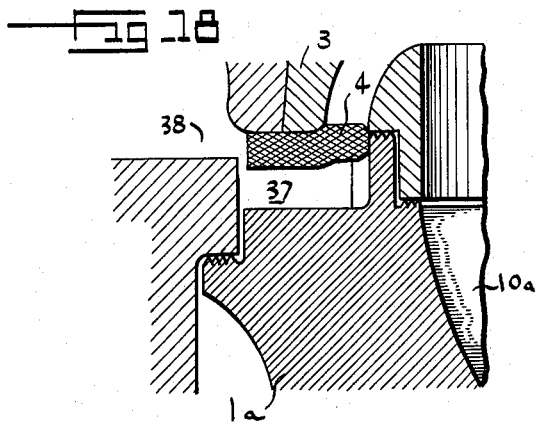
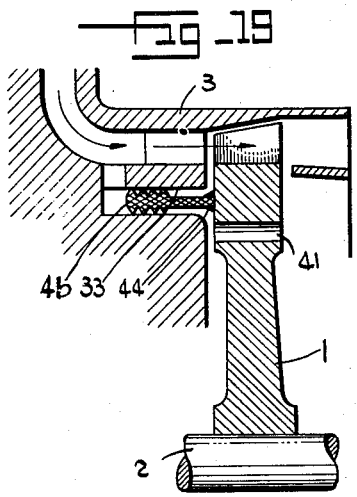
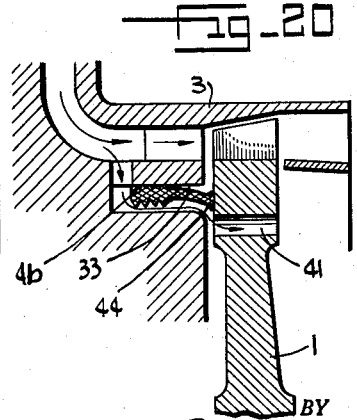
INVENTOR.
William D. Allingham
BY Reynolds, Beach & Christensen
Attorneys Nov. 29, 1960   W. D. ALLINGHAM   2,962,257
TURBINE OVERSPEED CONTROLS
Filed March 19, 1957   4 Sheets-Sheet 4
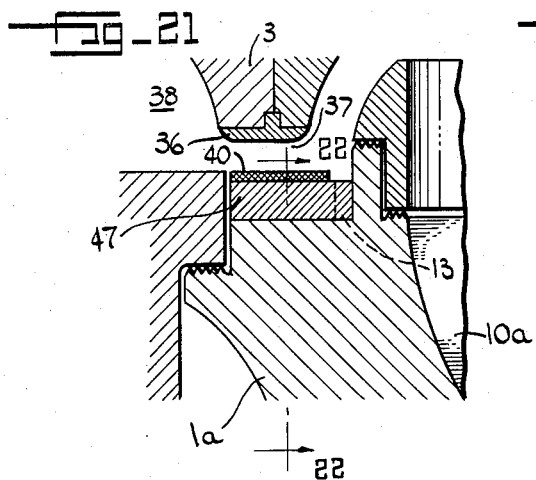
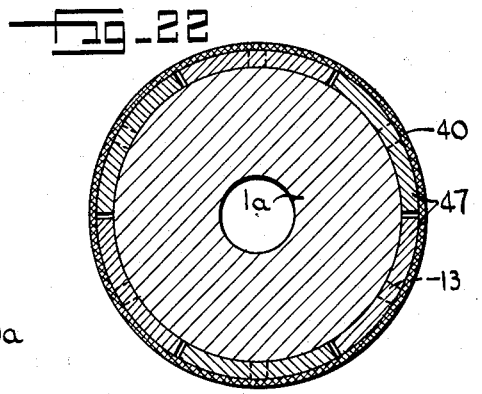
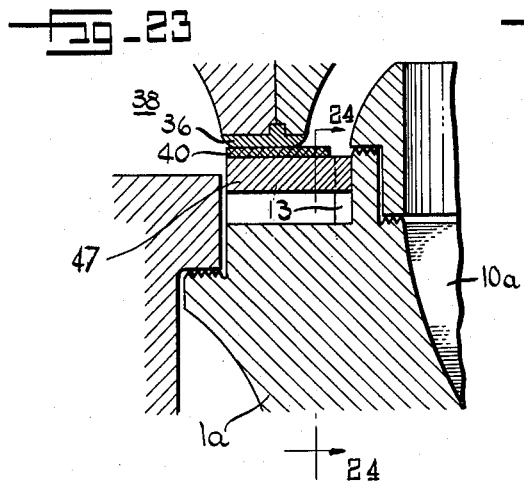
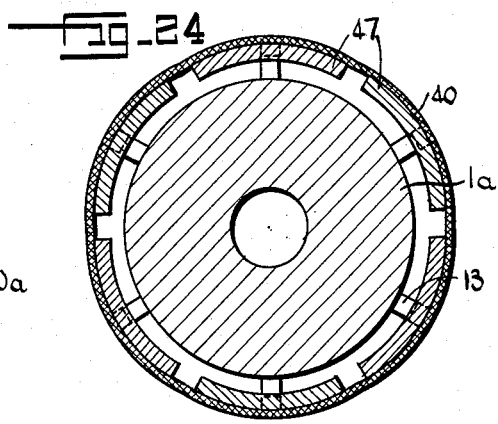
INVENTOR.
William D. Allingham
BY
Reynolds, Beach & Christensen
Attorneys United States Patent Office 2,962,257
Patented Nov. 29, 1960

TURBINE OVERSPEED CONTROLS

William D. Allingham, Seattle, Wash., assignor to Boeing Airplane Company, Seattle, Wash., a corporation of Delaware Filed Mar. 19, 1957, Ser. No. 647,000

14 Claims. (Cl. 253—59)

The turbine spools of gas turbine engines and other bladed rotors, such as the compressors thereof, rotate normally at very high speeds, in the range, for example, of 30,000 r.p.m. This produces in the rotor a high centrifugal force, which these rotors are designed to resist, but they will not stand an appreciably higher force. Occasionally, however, such rotors tend to overspeed, and when this occurs it is extremely likely to produce so large a centrifugal force that the rotor, in effect, explodes, causing great physical damage and, of course, putting the engine out of operation. Governors of the type which must operate to lessen the fuel supply upon the occurrence of overspeed are so slow-acting as to be ineffective to prevent such occurrences as have been indicated, because the margin between a safe speed and a dangerous overspeed is so narrow, and so quickly passed. Indeed, any regulating device which, upon initiation of overspeed, does not immediately and permanently disable the rotor's ability to rotate at excessive speeds—at least, until measures can be taken to correct the cause of its overspeeding—is likely only to delay the destruction of the rotor. It has been proposed, for example, to cause an elastically expansive element, rotative with the rotor, to rub frictionally upon an otherwise stationary complemental element, and by the frictionally caused movement of the complemental element to affect, for example, motive fluid supply to the rotor, reducing such supply and so slowing the rotor's speed. Such an arrangement in practice would be subject to numerous objections, one being that since the rotative element is elastically expansive with overspeed, it will contract elastically with reduced speed, and since the cause of the overspeed is not affected, the rotor will again overspeed. The alternate overspeeding and accompanying frictional rubbing, and slowing down, will produce a pulsating action in the rotor, the frictional surfaces will quickly wear to the point they are no longer effective, and the rotor, now devoid of restraint, will run away and disintegrate.

According to the present invention, there is built into the rotor, or there is operatively associated with it, and rotative with it, means which will automatically produce a persisting condition tending to slow down the rotor upon the occurrence of an overspeed beyond a safe upper limit. Preferably, this control device takes the form of a ring of ductile metal operatively connected to the rotor assembly to rotate therewith, and made of a metal or in a design which has a yield speed sufficiently high to maintain the ductile ring in its normal shape and disposition throughout the normal speed range, but its yield speed is sufficiently lower than the yield speed of the remainder of the rotor assembly that the ductile ring will yield plastically, that is to say, permanently, radially outwardly under the influence of centrifugal force, prior to the yielding of the remainder of the assembly, upon the attainment of a speed in excess of a predetermined limit. The term "yield speed," as used hereinabove and hereinafter, is intended to mean that rotational speed at which the maximum stress due to the action of centrifugal force is sufficient at some point in the rotating element to cause plastic yielding of the element. This stress, sometimes called the "yield point" of a material, is that stress beyond which expansion or strain of the ring or other element is no longer negligible in the sense of maintaining prescribed or normal clearances, and the yielded element will no longer return to a condition of normal clearance upon removal of the distorting force. The stress has produced permanent strain.

The yielding of the ductile ring will decelerate the speed of the rotor assembly in any one of a number of ways, or by a combination of such ways. For instance, being connected to the rotor assembly to rotate therewith, it may yield outwardly against an inwardly facing annular surface of the housing about the rotor, to rub on this inwardly facing surface as a brake. Again, it may be so positioned that normally it will not restrict fluid passages which lead the motive fluid to and past the blades of the rotor, but upon yielding, it will block such passages, partly or wholly, and so lessen or cut off the supply of motive fluid to the rotor blades. Again, and preferably it may in its normal disposition block by-pass passages around the rotor blades, but upon yielding it may open such by-pass passages, whereby a part of the motive fluid avoids passing the blades of the rotor, and in this way reduces the rotor speed. The by-pass passages may themselves be bladed, but reversely to the normal blades, thereby opposing the normal rotation when impinged by the by-passed fluid. Still further, yielding of the ductile ring may cause deformation of the rotor and its blades, to the end that the rotor will not thereafter function as intended. As has been indicated, the invention may be incorporated in a number of structural forms, and in a given form may include two or more such means of effective governance of the rotor.

The accompanying drawings are diagrammatic in character, all (with minor exceptions) being of the nature of axial half-sections through such a rotor and its housing, illustrating various arrangements incorporating the principles outlined above.

Figure 1 is a view of the character indicated above showing parts in their normal disposition; Figure 2 is a similar view showing parts after the ductile ring has yielded; and Figure 3 in part is a sectional view at the line 3—3 and in part a section along the line 3A—3A of Figure 2, all of these views illustrating the ductile ring functioning as a mechanical brake and as a means to open a by-pass passage in the event of excessive speed.

Figure 4 is a view similar to Figure 1, showing a modified arrangement, with parts in the normal disposition, and Figure 5 is a similar view showing parts after the ductile ring has yieded. In this form, the ductile ring upon yielding acts as a mechanical brake and also to block the supply of motive fluid to the blades of the rotor.

Figure 6 is a further modified form showing parts in the normal disposition, and Figure 7 is a similar view showing parts after yielding of the ductile ring, and Figure 8 is a sectional view at the line 8—8 of Figure 7. These views all show the ductile ring functioning upon yielding in three ways—to block the supply of motive fluid to the blades, to open a by-pass passage around the blades, and as a mechanical brake.

Figure 9 is a view similar to the preceding, showing the ductile ring as a part of the rotor assembly, but separate from the rotor itself, with parts in the normal disposition, and Figure 10 is a similar view showing parts after yielding has occurred.

Figure 11 is a view somewhat similar to Figure 9, and Figure 12 a view of the same construction, somewhat similar to Figure 10, showing the parts respectively in the normal disposition and in the yielded disposition, in a further modified arrangement.

Figure 13 is a view of a still further modification in which the ductile ring is incorporated directly in the structure of the rotor, and showing parts in the normal disposition, and Figure 14 is a similar view, showing parts after yielding has occurred.

Figure 15 is a view similar to the preceding views, showing the ductile ring disposed in a somewhat different arrangement and with parts in the normal disposition, and Figure 16 is an enlarged view of the portion thereof shown within the circle designated "16," while Figure 17 is a view similar to Figure 15, and Figure 18 an enlarged view similar to Figure 16, showing parts within the circle "18" of Figure 17, after yielding has occurred.

Figure 19 is a view similar to the preceding views, showing parts in the normal disposition, and Figure 20 is a similar view with parts in the disposition they would assume upon yielding, and illustrating a still further modification, in which the ductile ring is separate from but secured to the rotor.

Figure 21 is a view similar to the preceding views, showing the ductile ring combined with a segmental steel ring, and with parts in their normal dispositions, Figure 22 being a section at line 22—22 of Figure 21, and Figure 23 is a view similar to Figure 21, but with parts in their disposition following yielding of the ductile ring; Figure 24 is a section at line 24—24 of Figure 23.

In the drawings, with reference primarily to Figures 1, 2 and 3, the rotor in general is indicated by the numeral 1 fixed upon the shaft 2 and rotative with the latter. About its periphery the rotor is formed with blades 10. A housing 3 surrounds the rotor, and a motive fluid is led by a passage 30, 31 to and past the blades 10. Assuming the turbine's rotation to be effected by the motive fluid, a nozzle box 32 directs the fluid jets against the blades 10 of the rotor. As has been indicated, the arrangement is illustrated only diagrammatically.

In this particular form the rotor is formed with a ledge or flange 11 projecting from one face and received within an annular groove or recess in the adjacent face of the housing 3, one inwardly facing surface 33 whereof faces the external peripheral surface of the flange 11. These two surfaces are spaced from one another sufficiently to receive a ductile ring 4. This ring 4 is so connected to the rotor as to rotate therewith, and in Figure 3 the rotor's face is shown as provided with radially directed ribs 13 which interfit with the ductile ring 4. The outer peripheral face of the ductile ring may be provided with serrations and the inner peripheral surface of the flange 11 is similarly formed, to constitute labyrinthine seals against exit of the motive fluid. The serrated edges have sufficient clearance, under normal operating conditions, that unrestricted rotation occurs. The motive fluid can have access to the annular groove within which is received the ductile ring by reason of a by-pass passage 34.

In the normal condition of parts, as shown in Figure 1, the labyrinthine seals about the ductile ring 4 and the flange 11 prevent escape of motive fluid by the by-pass passage 34, and all of this fluid is directed through the nozzle box 32 and against the blades 10 to effect rotation of the rotor 1 in the normal way. Should overspeed occur, however, the ductile ring 4 having been chosen of a metal with a yield point and of a size and shape such that it has a yield speed sufficiently lower than the yield speed of the rotor that the ductile ring yields upon attaining a speed in excess of a safe upper limit, and before the rotor itself will yield, the ring yields in its plastic range, radially outwardly, as indicated in Figure 2. The rotor may be, for example, of 2014 T6 aluminum alloy, having a tensile yield point of 52,000 p.s.i., and the ring of 6061 T6 aluminum alloy, having a tensile yield point of 35,000 p.s.i. In yielding the ring contacts the inwardly facing annular surface 33. The ring 4 being still connected to the rotor for rotation therewith, by virtue of the multiple ribs 13, acts as a brake as it rubs against the surface 33, and so tends to slow down the rotor 1. Having yielded plastically, it continues so to rub. In addition, it opens a passage between its inner peripheral surface and the surface of the ledge 11 which affords access to a by-pass passage 14 through the rotor, so that a part of the motive fluid now passes by the passage 34, 14 and this lessens the supply of motive fluid to the blades 10 and further slows down the rotor.

The rotor may be positively slowed down by the by-passed fluid if the passages 14 be inclined or bladed reversely to the normal blades 10. Thus, in Figure 3, if normal operation effects rotation of the rotor in the sense R, opening of the inclined passages 14 to the motive fluid moving from left to right will impose a force tending to rotate the rotor in the reverse sense, and its rotation will be the resultant of the two opposed forces. The same principle can be employed in forms subsequently described.

Naturally, when yielding such as described above has occurred, the ductile ring will not return to its initial disposition upon deceleration, and the rotor is incapable of full and effective operation until the ductile ring 4 has been removed and replaced, but it is possible to operate the rotor in most cases at reduced effectiveness. Moreover, complete destruction of the turbine has been avoided.

In Figure 4 the construction differs from that of the first three figures primarily in that the passage 30 leads past the ductile ring 4 and by way of a passage 35 to the nozzle box 32, and parts are so arranged relatively that the ductile ring 4 during normal operation does not block the passage 35, as may be seen in Figure 4, but upon yielding of the ductile ring 4 outwardly, as indicated in Figure 5, it partially or wholly blocks the entrance to the passage 35, and so blocks or materially reduces the supply of motive fluid to the blades 10. In addition, the yielded ductile ring 4 serves as a brake as it rubs on the surface of the housing 3 which faces it.

The arrangement in Figures 6, 7 and 8 is quite similar to that of Figures 4 and 5, save that here the rotor is provided with a by-pass passage 14 which with the ductile ring 4 in its normal position in Figure 6 is blocked, but when the ring 4 yields as in Figure 7 the by-pass passages 14 are unblocked, and the motive fluid passes from the passage 30 by way of the by-pass passages 14 but does not pass through the blades 10. The ductile ring in this form operates in three ways to lessen the speed of the rotor, by acting as a brake, by cutting off the motive fluid supply to the blades, and by opening a by-pass passage around the blades for the motive fluid.

In the arrangements heretofore discussed the ductile ring has been mounted upon a ledge 11 projecting from a face of the rotor itself. In the form shown in Figures 9 and 10, the ductile ring constitutes part of a rotor assembly but is not necessarily mounted upon the rotor itself. Thus, a disk 40 is carried upon the shaft 2 alongside the rotor 1 and it is this disk 40 which at its periphery carries the ductile ring 4. In most respects, this form is similar to the form of Figures 6 and 7, the disk 40 having apertures 41 whereby the motive fluid, when flowing through the by-pass passage 34 to the by-pass passages 14, may pass through the rotor assembly, and specifically the disk 40, in the manner indicated in Figure 10.

The form of Figures 11 and 12 is similar to that of of Figures 1 and 2 with the exception that the disk 40 is separate from the rotor 1, though a part of the rotor assembly. Here the ductile ring 4 blocks the by-pass passage 42 in the disk 40 during normal operation, but when the ring 4 yields radially outwardly as in Figure 12 the passage 42 is opened and the fluid can now pass in part by the passage 42, 14.

In the form shown in Figures 13 and 14, the ductile ring 4a is incorporated as an integral part of the rotor 1, radially inwardly of the blades 10. Its yield speed is sufficiently high that it will not yield during normal rotation of the rotor, that is, within the normal range of speeds, but upon exceeding a safe limit the ductile ring 4a will yield somewhat in the manner shown in Figure 14, and the blades themselves or the exterior periphery of the rotor 1 will then rub as a brake against the adjacent inwardly facing peripheral surface of the housing 3.

The rotors in the previous examples have been assumed to be the driven turbine of a turbine engine. In the form shown in Figures 15 to 18, inclusive, the invention is applied to a rotor 1a of a compresser, for such a rotor too may tend to overspeed on occasion, or it may be a part of a turbo-jet engine that is to be protected against overspeeding. Here the blades 10a compress the air into the annular chamber 36 whence it is delivered by a restricted passage 37 to the annular chamber 38 of the housing. The ductile ring 4 is mounted at the inner periphery of the passage 37, and upon yielding, as in Figures 17 and 18, it closes this passage partially or wholly and also rubs as a brake against the housing surface.

In the form shown in Figures 19 and 20, the ductile ring 4b is formed separate from but is secured permanently to the rotor 1, as for example by welding or brazing at 44. It is of a size to have clearance within the annular slot in the housing wall but upon yielding outwardly as in Figure 20 it presses as a brake against the surface 33, and opens a passageway to the by-pass passage 41 in the rotor.

Figures 21 to 24 illustrate the invention applied, as in Figures 15 to 18, to a compressor rotor 1a, but now with the ductile ring made up of a complete annular rim 40 of ductile material, and an inner segmental base ring 47. The segments 47 afford appreciable mass, and the interlock afforded between the ribs 13 of the rotor 1a and these segments insures continued rotation (if that be desirable, as usually it will be) of the ductile ring even after the rim has yielded. The distributed, separate segmental masses 47 virtually insure yielding of the rim 40 entirely about the periphery at one time, and preclude yielding at a single weak spot only. The rotor housing may be formed with a hardened rubbing surface 36 whereon the ductile rim 40 may bear after it yields. As is clear, the faster the rotor rotates, the more strongly are the segments 47 urged centrifugally outwardly.

In order that by-passes may be employed to reduce flow to the turbine blades, thereby reducing turbine speed, it is obvious that the motive fluid source must be limited to a flow rate only slightly greater than that which the turbine nozzles will pass. This can be done in a manner such as is diagrammatically suggested in Figure 1, by including a sonic venturi 39 having an effective throat area equal to, or but slightly larger than, the effective turbine nozzle area. Such a sonic venturi could be incorporated in the turbine inlet passages as an integral part of the turbine, or could be installed in the inlet ducting.

I claim as my invention:

1. A high speed rotative device including, in combination, a rotor assembly, a housing surrounding the same, a ductile ring operatively connected to the rotor assembly for rotation therewith, said ductile ring being chosen of a material, and of a size and shape, such that its yield point under centrifugal force is reached upon exceeding by a given amount the rotor assembly's normal speed range, and the rotor assembly is chosen of a material, and of a size and shape, such that its yield point is not reached at the speed at which the ring's yield point is reached, whereby said ring will yield plastically upon exceeding such range by such given amount, and speed-limiting means operatively associated with said ring, and normally held by the ring in an inactive position, but arranged to shift into an active position to limit the speed of said rotor assembly, upon the ring's yielding plastically.

2. The combination of claim 1, wherein the ring is made up of an unbroken annular rim having the low yield speed and a segmental inner annulus, each of appreciable mass, and means to interlock the individual segments to the rotor assembly for conjoint rotation and for radially outward movement upon yielding of the rim.

3. In a turbine engine for propulsion of an aircraft or the like, in combination, a bladed rotor assembly, a housing surrounding the same and formed with passages to lead a motive fluid to and beyond the rotor assembly's blades, means to limit the rotational speed of the rotor assembly, said speed-limiting means including a ductile ring operatively connected to the rotor assembly for rotation therewith, said ductile ring being chosen of a metal and of a size and shape to have a resistance to yielding under centrifugal force at all speeds within the rotor assembly's normal speed range, but to yield plastically upon materially exceeding such range, the remainder of said rotor assembly having a yield speed above such yield speed of said ductile ring, said ductile ring being located relative to certain of said motive fluid passages to lessen the supply of fluid to the blades, upon its yielding.

4. The combination of claim 3, wherein the ring is located normally radially inwardly of said passages leading to the blades, and is of such size relative to said passages that upon yielding it blocks such passages.

5. The combination of claim 3 including additionally by-pass passages to lead the motive fluid around and beyond the blades, and wherein the ring is located, in its normal, non-yielded position, to block said by-pass passages, and upon yielding to clear the same.

6. The combination of claim 5, including a sonic venturi interposed in the fluid passages in advance of the rotor, of a size to limit the flow rate to an effective value not substantially greater than that permitted by the effective turbine nozzle area.

7. In a turbine engine for propulsion of an aircraft or the like, in combination with a rotor assembly including a ductile ring and a plurality of blades, a housing surrounding the assembly and formed with passage means to lead a motive fluid to and beyond said blades, the assembly, including the ductile ring, being normally of a size and shape to clear the housing and the metal of said ductile ring being chosen to have a yield speed sufficiently high to maintain the shape and clearance of the assembly throughout the normal speed range, but sufficiently lower than the yield speed of the remainder of the assembly to yield plastically and radially outwardly under the influence of centrifugal force, prior to yielding of the remainder of the assembly, upon attainment of a speed in excess of a predetermined upper limit, for contact of a peripheral portion of the ductile ring with a portion of the housing that is disposed radially outwardly of such peripheral portion of the assembly.

8. The combination of claim 7, wherein the passage means for supply of motive fluid to the blades include the space between the ductile ring and the annular portion of the housing which the ring contacts upon yielding, whereby such passage means are restricted by yielding of the ring towards such surface.

9. The combination of claim 7, including a by-pass passage for by-passing the fluid around said blades, the ring in its normal position blocking said by-pass passage, but upon yielding unblocking the same.

10. The combination of claim 7, including fluid passages in the housing and in the rotor by-passing the blades, the ductile ring being so located as to block fluid flow through said by-pass passages during operation, within the normal speed range, but upon yielding to open said by-pass passages and to restrict the primary fluid passages.

11. The combination of claim 10, wherein the by-pass passages in the rotor are bladed, but the blades thereof are pitched reversely to the motive blades of the rotor.

12. In combination with a bladed high speed rotor, a flange projecting from a face thereof, a housing surrounding the rotor and formed with passages to lead a motive fluid to and beyond the rotor's blades, past said flange, said housing having an inwardly facing annular surface surrounding and spaced from said flange, a ductile ring surrounding said flange and operatively connected to the rotor to rotate therewith, and normally spaced from said annular housing surface sufficiently to afford unrestricted passage of the motive fluid, said ring being chosen of a metal and of a size and shape to have a yield speed sufficiently high to maintain its disposition relative to the rotor and housing during rotation within the normal speed range, but sufficiently lower than the yield speed of the rotor to yield plastically and permanently, radially outwardly to restrict the fluid passage between itself and the annular housing surface, and to open a passage between itself and the flange, prior to yielding of the rotor, upon attainment of a speed in excess of a predetermined upper limit, the rotor having by-pass passages communicating with the passage so opened, but blocked by the ductile ring while the latter is in its normal, nonyielded position.

13. In combination with a bladed high speed rotor, a flange projecting from a face thereof, a housing surrounding the rotor and formed with passages to lead a motive fluid to and beyond the rotor's blades, said housing having an inwardly facing annular surface surrounding and spaced from said flange, a ductile ring surrounding said flange and operatively connected to the rotor to rotate therewith, and normally spaced from contact with said annular housing surface, said ring being chosen of a metal and in a size and shape to have a yield speed sufficiently high to maintain its disposition relative to the rotor and the housing during rotation within the normal speed range, but sufficiently lower than the yield speed of the rotor to yield plastically and permanently, radially outwardly into contact with said annular surface of the housing, prior to yielding of the rotor, upon attainment of a speed in excess of a predetermined upper limit.

14. In combination with a bladed high speed rotor, a flange projecting from a face thereof, a housing surrounding the rotor and formed with passages to lead a motive fluid to and beyond the rotor's blades, past said flange, said housing having an inwardly facing annular surface surrounding and spaced from said flange, a ductile ring surrounding said flange and operatively connected to the rotor to rotate therewith, and normally spaced from said annular housing surface sufficiently to afford unrestricted passage of the motive fluid, said ring being chosen of a metal and of a size and shape to have a yield speed sufficiently high to maintain its disposition relative to the rotor and housing during rotation within the normal speed range, but sufficiently lower than the yield speed of the rotor to yield plastically and permanently, radially outwardly to restrict the fluid passage between itself and the annular housing surface, prior to yielding of the rotor, upon attainment of a speed in excess of a predetermined upper limit.

References Cited in the file of this patent

UNITED STATES PATENTS

| 942,828 | Holly | Dec. 7, 1909 |
| 1,154,594 | Rice | Sept. 21, 1915 |
| 1,302,060 | Loewenstein | Apr. 29, 1919 |
| 1,600,346 | MacMurchy | Sept. 21, 1926 |
| 2,459,519 | Graham et al. | Jan. 18, 1949 |
| 2,569,898 | Millns | Oct. 2, 1951 |
| 2,733,891 | Millns et al. | Feb. 7, 1956 |

FOREIGN PATENTS

| 736,032 | Great Britain | Aug. 31, 1955 |
| 874,318 | France | Apr. 27, 1942 |